United States Patent [19]
Stephenson et al.

[11] Patent Number: 6,043,856
[45] Date of Patent: Mar. 28, 2000

[54] LIQUID CRYSTAL DISPERSION DISPLAY USING OPAQUE CONDUCTIVE LAYERS INCLUDING DEVELOPED SILVER

[75] Inventors: Stanley W. Stephenson, Spencerport; Charles D. DeBoer, Palmyra; Roger T. McCleary, Kendall, all of N.Y.

[73] Assignee: Eastman Kodak Company, Rochester, N.Y.

[21] Appl. No.: 08/992,892

[22] Filed: Dec. 18, 1997

[51] Int. Cl.[7] .................................................. G02F 1/1333
[52] U.S. Cl. .............................. 349/86; 349/110; 349/111
[58] Field of Search ............................... 349/86, 110, 111

[56] References Cited

U.S. PATENT DOCUMENTS

| | | | |
|---|---|---|---|
| 4,734,355 | 3/1988 | Lewis et al. | 430/270 |
| 5,434,688 | 7/1995 | Saitoh et al. | 349/86 |
| 5,453,864 | 9/1995 | Yamada et al. | 349/182 |
| 5,469,278 | 11/1995 | Takahara et al. | 349/86 |
| 5,566,008 | 10/1996 | Yoshida et al. | 349/86 |
| 5,583,675 | 12/1996 | Yamada et al. | 349/86 |
| 5,695,690 | 12/1997 | Swirbel et al. | 252/582 |

FOREIGN PATENT DOCUMENTS 63-123002   5/1988   Japan .

*Primary Examiner*—William L. Sikes
*Assistant Examiner*—Tarifur R. Chowdhury
*Attorney, Agent, or Firm*—Raymond L. Owens

[57] ABSTRACT

A liquid crystal dispersion display including an opaque first conductive layer including developed silver crystals and having a plurality of first openings for transmission of light; a water permeable coated layer having dispersed liquid crystals in a binder over the opaque first conductive layer; an opaque second conductive layer including developed silver crystals coated over and coextensive with portions of the opaque first conductive layer and formed with second openings which are offset from the first openings; and a structure for changing the electrical potential between the first and second conductive layers so as to effect a change in the dispersed liquid crystals which in a first state causes light which passes through the first openings to be absorbed by the second conductive layer and in a second state which causes light to be scattered and passed out through the second openings in the display.

9 Claims, 2 Drawing Sheets

LIQUID CRYSTAL DISPERSION DISPLAY USING OPAQUE CONDUCTIVE LAYERS INCLUDING DEVELOPED SILVER

CROSS REFERENCE TO RELATED APPLICATIONS

The present invention is related to commonly assigned U.S. patent application Ser. No. 08/961,059 filed Oct. 30, 1997, entitled "Display Apparatus Using Light Patternable Conductive Traces" by Stanley W. Stephenson and U.S. patent application Ser. No. 08/961,056 filed Oct. 30, 1997, entitled "Single Sheet Display Having Patternable Conductive Traces" by Stanley W. Stephenson, the disclosure of these retained applications are incorporated herein by reference.

FIELD OF THE INVENTION

The present invention relates to flat panel liquid crystal image displays that use electrically modulated signals to control light passing through the display.

BACKGROUND OF THE INVENTION

Flat panel displays can be fabricated using many techniques. Typical embodiments are disclosed in *Liquid Crystal Flat Panel Displays* by William C. O'Mara (Chapman & Hall, New York, 1993), and other similar publications. These displays use transparent glass plates as substrates, and electrical traces are sputtered in a pattern of parallel lines that form a first set of conductive traces. A transparent conductor such as Indium Tin Oxide is sputtered over the traces to disperse an electrical charge across transparent areas not blocked by the traces. A second substrate is similarly coated with a set of traces having a transparent conductive layer. Layers are applied over the substrates and patterned to orient liquid crystals in twisted nematic (TN) or super-twisted-nematic (STN) configurations. The two substrates are spaced apart and the space between the two substrates is filled with a liquid crystal material. Pairs of conductors from either set are selected and energized to alter the polarization properties of the liquid crystal material. A pair of polarizers on each side of the liquid crystal allow light to pass through the assembly or to be absorbed by the second polarizer when the liquid crystal is activated. The patterning of the transparent conductors is done by photoresist exposure, development, and etching, and is generally done on glass substrates. The entire process of building a liquid crystal display is complex, tedious and expensive.

SUMMARY OF THE INVENTION

It is an object of the present invention to have a simpler way for the preparation of a liquid crystal display.

It is another object of the present invention to provide an improved display which makes use of coating technology to ensure that the different layers of the display are precisely registered and can be manufactured in volume.

These objects are achieved in a display comprising:

(a) an opaque first conductive layer including developed silver crystals and having a plurality of first openings for transmission of light;

(b) a water permeable coated layer having dispersed liquid crystals in a binder over the opaque first conductive layer;

(c) an opaque second conductive layer including developed silver crystals coated over and coextensive with portions of the opaque first conductive layer and formed with second openings which are offset from the first openings; and (d) means for changing the electrical potential between the first and second conductive layers so as to effect a change in the dispersed liquid crystals which in a first state causes light which passes through the first openings to be absorbed by the second conductive layer and in a second state which causes light to be scattered and passed out through the second openings in the display.

DETAILED DESCRIPTION OF THE INVENTION

Figure 1:
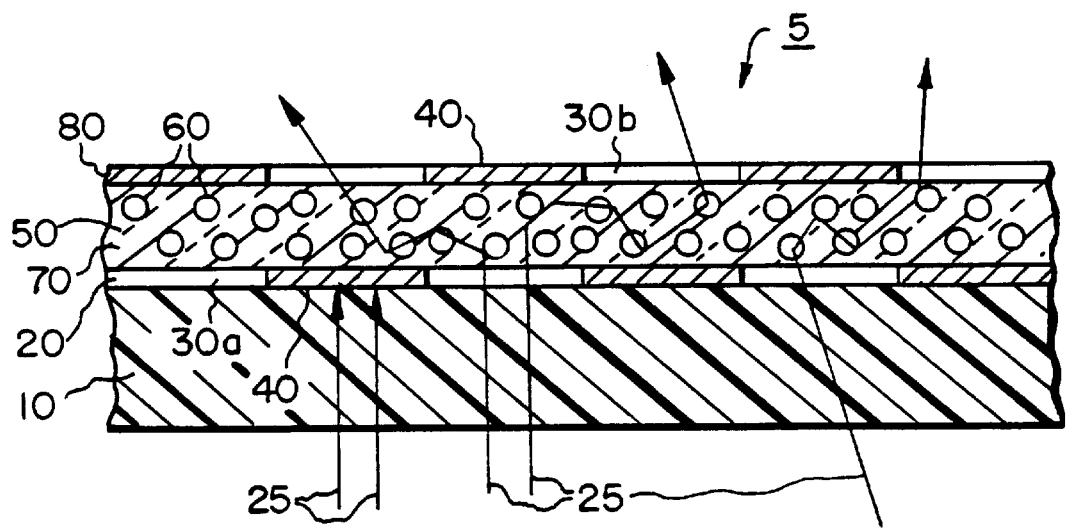
FIG. 1 is a cross-sectional view of a display in accordance with the present invention which is illuminated or in the bright state.

FIG. 1 shows a close-up cross-sectional view of the display 5 in the "on" or bright state. This is the state when images are being shown. A transparent support 10 is shown. The support may be rigid, such as glass or plastic, or may be flexible, such as 100 micrometer thick palyethyleneterphthalate. Over the support is disposed an opaque first conductive layer 20 including a contiguous layer of gelatin containing developed silver (see Example 2) in an amount sufficient to be electrically conductive at better than 500 ohms per square. Opaque first conductive layer 20 has transparent areas, or openings, 30a surrounded by opaque areas 40. Opaque areas 40 can be developed black silver that absorbs light. Openings 30a admit light, shown by arrows 25, into display 5. Above opaque first conductive layer 20, and continuous with it, is disposed a liquid crystal layer 50 having dispersed liquid crystals 60 in a binder 70. Binder 70 is a conventional gelatin preparation. Liquid crystals 60 may be a single liquid crystal material, or a mixture of liquid crystal material, either monomeric or polymeric. The choice of liquid crystal 60 will be dictated by considerations of refractive index, phase transition temperature, stability, electrical response time, cost, and availability. Above liquid crystal layer 50 is disposed an opaque second conductive layer 80, which is similar to the opaque first conductive layer 20, also having openings 30b surrounded by opaque areas 40. Opaque second conductive layer 80 is formed so its openings 30b are offset from the openings 30a of opaque first conductive layer Because the openings 30a and 30b are offset, light cannot pass straight through the layers. Opaque conductive layers 20 and 80 are formed of developed black silver and absorb light that strikes directly. A back illumination light is used and only light which has been which has been scattered by liquid crystal layer 50 can be seen through display 5.

In FIG. 1 display 5 is shown in its neutral, electrically uncharged state. In that state dispersed liquid crystals 60 are randomly oriented and change with time as the dispersed liquid crystals 50 are free to rotate within the binder. This results in a light scattering condition, as shown by arrows 25, and some of the light which passes through openings 30a in opaque first conductive layer 20 will be scattered by dispersed liquid crystals 60 and pass through openings 30b in opaque second conductive layer 80.

Figure 2:
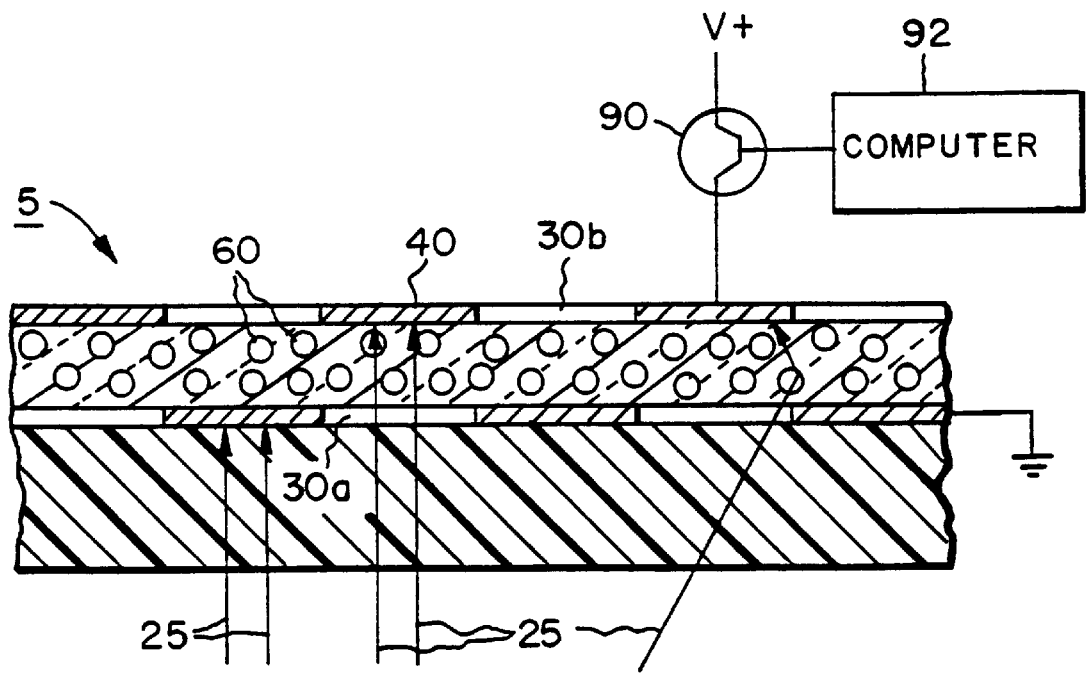
FIG. 2 is a cross-sectional view of the display of FIG. 1 in the dark state.

In FIG. 2, display 5 is shown in an electrically charged state. An electrical field is generated by a voltage difference between opaque conductive layers 20 and 80. The field causes dispersed liquid crystals 60 to align with the field, which reduces the difference in refractive index between the liquid crystal droplet and the surrounding binder. In FIG. 2, voltage V+is used by a transistor operating as switch element 90 under the control of a computer 92. In the conductive state, a potential occurs between the first and second opaque conducting layers 20 and 80. Any conventional arrangement for applying such potential to produce an electrically charged state of the display will suggest itself to those skilled in the art. As a result, light, scattering does not occur, and light which passes through openings 30*a* in opaque first conductive layer 20 will be absorbed by opaque second conductive layer 80 as shown by the arrows 25, and a viewer will see little or no light. The electrically energized state shown in FIG. 2 is a dark state to a viewer.

Figure 3:
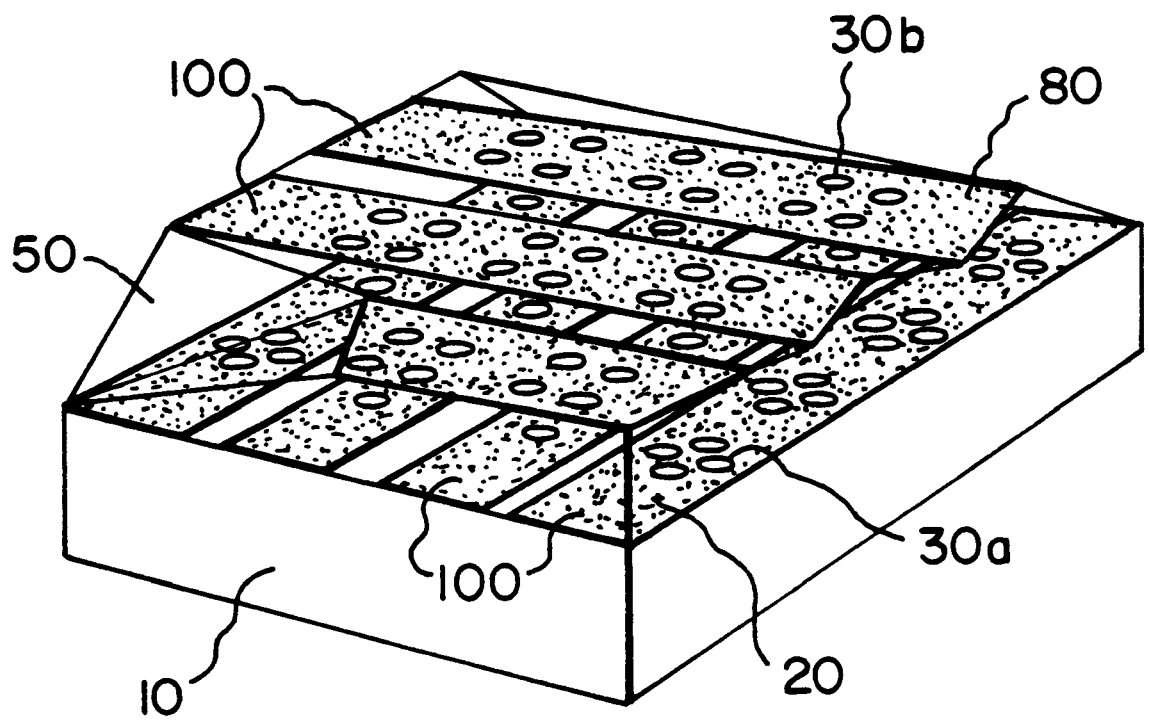
FIG. 3 is a perspective of the display of FIG. 1.

FIG. 3 shows a perspective view of display 5. Transparent support is shown with traces 100 of the opaque first conductive layer 20 having the openings 30*a* in groups of four. Liquid crystal layer 50 is transparent in the figure for clarity. Opaque second conductive layer 80 is shown as trace 100 running in an orthogonal direction to traces 100 for opaque first conductive layer 20. Openings 3*b* in opaque second conductive layer 80 are offset from those in opaque first conductive layer 20.

Operation of display 5 follows: When a voltage is applied to traces 100 in opaque first and second opaque Conductive layer 20 and 80, an electric field is generated at the intersection of the traces 100 which drive liquid crystal layer 50 to clear state, generating a dark pixel in the display. Areas not having a voltage on both opaque conductive layers 20 and 80 remain light scattering and those areas remain light transmissive. Selective darkening of pixel elements on display 5 permit images to be generated.

Opaque conductive layers 20 and 80 of the invention can be formed by exposing silver halide coatings to a light pattern to define the horizontal and vertical traces 100 and openings 30*a* and 30*b*. The silver halide coatings are photographically developed to produce opaque, conductive silver traces 100. The fixer of the photographic development process dissolves away the unexposed silver halide to produce openings 30*a* and 30*b* and traces 100 in opaque conductive layers 20 and 80. Opaque conductive layers 20 and 80 are coated with silver halide material sensitized to different wavelengths of light. Binder 70 is gelatin or another water permeable material to permit development of opaque first conductive layer 20. This structure permits first conductive layer 20 to be patterned with a first wavelength of light simultaneous with patterning second conductive layer 80 with a second wavelength of light. This eliminates registration problems associated with separate exposures for each of opaque conductive layers 20 and 80. Both layers can then be developed at the same time, thus generating the entire display in a few simple and economical steps.

The following examples will serve to further illustrate the practice of the invention.

Example 1

Dispersion Preparation

A solution of 25 g of gelatin and 25 ml of a 10% solution of sodium tri-isopropyl naphthalene sulfonate in 450 g of water was melted at 40° C. and stirred rapidly while slowly pouring in a solution of 20 g of 4-pentyl-4'-cyano biphenyl and 20 g of cyclohexanone. The mixture was stirred for 2 minutes and then run through a colloid mill with a 0.012 inch gap three times. The mixture was then chilled until set, cut into noodles the size of spaghetti and washed with chilled water saturated with crushed alabaster for 6 hours. The noodles were then drained to give a dispersion of 4% liquid crystal in 5% gelatin. Microscopic evaluation of the dispersion showed dispersed liquid crystal droplets about 1 micron in size. Under crossed polarizers at room temperature the droplets could be seen to be fluctuating in polarization, indicating the contents of the droplet are in the nematic liquid crystal state and are freely rotating. A portion of the dispersion was melted and spun coat on glass at 1000 rpm to give a dry layer of liquid crystal dispersion in gelatin. The layer was hazy in appearance due to the liquid crystal droplets. When heated with an hot air gun to the nematic-isotropic phase change temperature (110° C.) the layer cleared and became transparent. Upon cooling, the haziness reappeared. The variation of optical transmission of the liquid crystal in gelatin indicates suitability for application in display 5.

Example 2

Conductive Silver Layer Preparation

To a sufficient amount of a tabular photographic silver halide emulsion (dispersion) containing 3 mole percent iodide and 97 mole percent bromide, bearing chemical and spectral sensitization for green-light exposures, having average dimensions of 5 microns equivalent circular diameter and 0.14 micron thickness, and containing 4 g gelatin/mole Ag and a concentration of 0.752 kg/mole Ag, to result in a coated laydown of 50 mg Ag/ft$^2$ was added sufficient 35 wt% gelatin and water as needed for coatability to provide an additional coated laydown of 25 mg gel/ft$^2$. Surfactant and hardener were added just prior to machine coating on cellulose triacetate support that was pre-coated with gelatin at a laydown of 454 mg gel/ft$^2$. Similarly, sufficient emulsion and gelatin were mixed and coated to provide laydowns of 100 and 200 mg Ag/ft$^2$.

The photographically sensitive coatings were stepwise exposed to green light and subjected to conventional photographic processing using Kodak Rapid X-Ray developer for 5.5 min at 75 ° F., Kodak Acid Stop Bath (30 sec) and Kodak Flexicolor Bleach (7 min) and thorough washing to produce developed silver.

Resistance measurements were made on coatings that had been equilibrated with ambient air at 72 ° F. and 25% RH. Samples cut to 1×3.5 cm were grasped on opposing 1 cm sides by pinch or alligator clips such that the tips of the clips were separated by 2.3 cm. The alligator clips were connected to a Keithley Model 196 System Digital Multimeter operating in the autoranging ohms mode. A fully exposed coating at 200 mg Ag/ft$^2$ absorbed light and had an optical density of 1.38. These coatings had a measured conductivity of 250 ohms. The resistance of the produced layer would be adequate for carrying the electrical potential required for the invention.

The invention has been described in detail with particular reference to certain preferred embodiments thereof, but it will be understood that variations and modifications can be effected within the spirit and scope of the invention.

What is claimed is:

1. A liquid crystal dispersion display comprising:
   a) an opaque first conductive layer including developed silver crystals and having a plurality of first openings for transmission of light;
   b) a water permeable coated layer having dispersed liquid crystals in a binder over the opaque first conductive layer;

c) an opaque second conductive layer including developed silver crystals coated over and coextensive with portions of the opaque first conductive layer and formed with second openings which are offset from the first openings; and d) means for changing the electrical potential between the first and second conductive layers so as to effect a change in the dispersed liquid crystals which in a first state causes light which passes through the first openings to be absorbed by the second conductive layer and in a second state which causes light to be scattered and passed out through the second openings in the display.

2. The liquid crystal dispersion display of claim 1 wherein the water permeable coated layer includes gelatin.

3. A liquid crystal dispersion display comprising:

a) an opaque first conductive layer including developed silver crystals and having a plurality of first openings for transmission of light;

b) a layer having dispersed liquid crystals in a binder over the opaque first conductive layer;

c) an opaque second conductive layer including developed silver crystals coated over and coextensive with portions of the opaque first conductive layer and formed with second openings which are offset from the first openings; and d) means for changing the electrical potential between the first and second conductive layers so as to effect a change in the dispersed liquid crystals which in a first state causes light which passes through the first openings to be absorbed by the second conductive layer and in a second state which causes light to be scattered and passed out through the second openings in the display.

4. The liquid crystal dispersion display of claim 3 wherein there is at least one state which causes light to be absorbed by the second conductive layer and scattered by the liquid crystal dispersions.

5. The liquid crystal dispersion display of claim 3 wherein the first conductive layer provides a flexible support.

6. The liquid crystal dispersion display of claim 3 wherein silver halide crystals can be selected to be sensitive to different wavelengths of light.

7. A liquid crystal dispersion display comprising:

a) an opaque first conductive layer including developed silver crystals exposed at a first wavelength of light and having a plurality of first openings for transmission of light;

b) a water permeable layer having dispersed liquid crystals in a binder over the opaque first conductive layer;

c) an opaque second conductive layer including developed silver crystals exposed a second wavelength of light coated over and coextensive with portions of the opaque first conductive layer and formed with second openings which are offset from the first openings;

d) means for changing, the electrical potential between the first and second conductive layers so as to effect a change in the dispersed liquid crystals which in a first state causes light which passes through the first openings to be absorbed by the second conductive layer and in a second state which causes light to be scattered and passed out through the second openings in the display; and e) a flexible transparent support secured to either the first or second conductive layers.

8. The liquid crystal dispersion display of claim 7 wherein the flexible transparent support is formed from an organic polymer.

9. A method of making a liquid crystal dispersion display comprising the steps of:

a) coating a first layer over a transparent support with such first layer having developable silver halide crystals sensitive to light in a first portion of the spectrum;

b) coating a water permeable second layer having a dispersion of liquid crystals in a binder over the first layer;

c) coating a third layer over the second layer having developable silver halide crystals sensitive to light in a second portion of the spectrum; and d) exposing to the first and third layers to light in selected portions of the spectrum and developing the first and second silver halide crystals to make the first and third layers conductive and to form offset openings in the first and third conductive layers.

* * * * *